United States Patent
Carr

(10) Patent No.: US 8,421,629 B2
(45) Date of Patent: Apr. 16, 2013

(54) SYSTEM FOR POWER CONTROL AND MEMORY ACCESS OF HYBRID RFID TAGS

(76) Inventor: William N. Carr, Montclair, NJ (US)

( * ) Notice: Subject to any disclaimer, the term of this patent is extended or adjusted under 35 U.S.C. 154(b) by 0 days.

(21) Appl. No.: 13/528,615

(22) Filed: Jun. 20, 2012

(65) Prior Publication Data
US 2012/0256733 A1  Oct. 11, 2012

Related U.S. Application Data

(62) Division of application No. 12/459,585, filed on Jul. 2, 2009, now abandoned.

(60) Provisional application No. 61/209,897, filed on Mar. 13, 2009.

(51) Int. Cl.
*G08B 21/00* (2006.01)
(52) U.S. Cl.
USPC .................... 340/572.1; 340/10.1; 340/539.3
(58) Field of Classification Search .... 340/539.1–539.3, 340/572.1–572.8, 10.1
See application file for complete search history.

(56) References Cited

U.S. PATENT DOCUMENTS

| 7,348,875 B2 | 3/2008 | Hughes et al. |
| 2005/0248438 A1* | 11/2005 | Hughes et al. ............... 340/10.4 |

* cited by examiner

*Primary Examiner* — Jeffery Hofsass
(74) *Attorney, Agent, or Firm* — Kaplan Breyer Schwarz & Ottesen, LLP

(57) ABSTRACT

A system for monitoring parameters associated with a device, such as current, voltage, power, temperature, energy consumed, moisture, fluid levels and flow, wind speed, identification parameters, and repair history. The system includes the use of hybrid RFID sensor tags including a combination of active, semi-passive, and passive RFID circuits. Hybrid tags are attached to electrical system components. Standalone electrical components and generators and those connected to the electrical grid may be monitored. Data collected and stored in the hybrid tags may be accessed via a wireless communication link between hybrid tags and either active scanners or a passive interrogators. The data collected and processed from the hybrid tags may be provided to a user via the Internet or another wired or wireless communication network.

11 Claims, 3 Drawing Sheets

SYSTEM FOR POWER CONTROL AND MEMORY ACCESS OF HYBRID RFID TAGS

CROSS-REFERENCE TO RELATED APPLICATIONS

This application is a divisional application from U.S. patent application Ser. No. 12/459,585, filed 2 Jul., 2009, which claims priority under 35 U.S.C. §119(e) from U.S. Provisional Patent Application 61/209,897, filed Mar. 13, 2009. Both of these applications are incorporated by reference.

BACKGROUND OF THE INVENTION

1. Field of the Invention

The present invention relates to Radio-frequency identification (RFID).

2. Description of the Related Art

RFID is the use of an object, which is typically referred to as an RFID tag, for the purpose of identification and tracking using radio waves. Generally, the RFID tag is physically attached to a product, person, or other object. RFID tags can be categorized into three basic types: active, passive, and semi-passive.

An active RFID tag is a wireless device that is powered locally and contains a local radio frequency (RF) receiver and a source of RF power that actively transmits to a remotely located network node. An active RFID tag can be powered from a local battery or from an external source, such as the AC power grid or a photovoltaic solar panel. The present state of the art for a wireless network consisting of active RFID tags permits the network to be extended over many miles. For example, the current state of the art for an active ZigBee circuit transponder operating at 915 MHz operating within the US FCC Part 15 RF emission limits with an appropriate antenna is approximately 10 miles. ZigBee is a low-cost, low-power, wireless mesh networking standard.

A passive RFID tag is a wireless device that is powered by RF power received from a nearby interrogator. A passive RFID tag contains a local radio receiver but it communicates with the interrogator only by modulating and reflecting the RF radiation provided by the interrogator. This method is sometimes referred to as modulated backscatter.

The passive RFID tag receives wireless data from the interrogator by demodulating an RF carrier received from the interrogator and decoding the data from the demodulated signal. The passive RFID tag transmits data to the interrogator by reflecting the RF radiation provided by the interrogator and modulating data onto the reflected radiation by adjusting the load impedance of the tag antenna. The interrogator decodes the data from the reflected radiation.

In a fully passive RFID tag there are no local power sources such as batteries, solar cells, solar panels, piezoelectric generators, or the power grid. A fully passive RFID tag can be powered by a circuit that scavenges power from incident RF originating from an interrogator. The present state of the art for a passive RFID network permits a separation between the passive RFID tag and a wireless interrogator of up to 60 meters.

A semi-passive RFID tag provides the passive tag function as a subset of its total function. However, a semi-passive RFID tag also receives power locally. During normal operation the semi-passive RFID tag does scavenge power from the remote interrogator. The semi-passive RFID tag is usually powered locally from a battery, the power grid, solar cells, solar panels, wind generation source, vibration scavenging source, piezoelectric power source, or some other power source. The local power supply is given priority in supplying power to the tag by a local prioritizing power control circuit. When the local power supply is not adequate the prioritizing power-control circuit gates in power to the passive tag by scavenging from the RF incident energy supplied by the remote interrogator device.

Traditional RFID systems use tags containing digital memory. The digital memory within the tag can be read from or written to by an interrogator. These traditional systems do not include sensors to determine the state or condition of other devices, and are thus limited to applications that require only storage and retrieval of data, such as inventory control systems. Additionally, traditional RFID tags include only one type of RFID circuit, and thus, must either include a power source to constantly supply power to an active RFID circuit, or are limited to applications requiring only a passive RFID circuit.

Therefore, there is need in the art for a more complex RFID system. Specifically, there is a need for a system including an RFID tag that contains both an active and a passive circuit. Additionally, there is a need for an RFID tag that can sense, control, log, and monitor electrical and identification parameters from a power source or a power load device. The present invention satisfies these and other needs.

BRIEF SUMMARY OF THE INVENTION

According to a first aspect of the present invention, a hybrid RFID tag is described. The hybrid RFID tag contains both an active RFID circuit and a passive RFID circuit. The Active RFID circuit is typically powered by an external source such as the AC power grid or a solar panel. If this power source becomes unavailable or is degraded, e.g., during a brown-out, the active RFID circuit enters a sleep mode, which reduces the power required by the active RFID circuit. The passive RFID circuit, which does not require local power, but instead scavenges power from received radio frequency transmissions, can direct the active RFID circuit to exit the sleep mode. The passive RFID circuit may be directed to wake up the active RFID circuit by an interrogator. An interrogator is a device, which is typically handheld, that can communicate with passive RFID circuits.

In accordance with another aspect of the present invention, the active RFID circuit is communicatively coupled to a plurality of sensors. The sensors may measure properties associated with a device or object. For example, the voltage, current, or power provided to a load or the rate of fluid flow through a pipe may be measured. The sensors may also be used to measure environmental parameters such as temperature, wind speed, and humidity. Sensors may also record audio, still images, and video images, including slow scan video. The active RFID circuit may log data retrieved from the sensors in a non-volatile memory such as ferroelectric memory, magnetoresistive memory, flash memory, static ram provided with a battery backup, or a hard disk drive. The passive circuit may also have access to the non-volatile memory.

In accordance with yet another aspect of the present invention, an RFID system comprising hybrid tags and one or more network interrogators and scanners is described. The system may include a network of active nodes configured in a star or mesh network. A network scanner communicates with the hybrid tags via this network of active nodes. The network scanner can communicate with the active RFID circuit to control the active RFID circuit and to retrieve sensor data or other information from the active RFID circuit.

The system also includes at least one interrogator, which communicates with the passive circuit in each of the hybrid tags. The interrogator may direct the passive circuit in the hybrid tag to take the active circuit in the hybrid tag out of sleep mode. The interrogator may also download previously stored sensor data by directing the passive circuit to retrieve this data from the shared non-volatile memory.

BRIEF DESCRIPTION OF THE SEVERAL VIEWS OF THE DRAWINGS

The foregoing and other features of the present invention will be more readily apparent from the following detailed description and drawings of illustrative embodiments of the invention in which.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description, discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage, or mode of operation.

Figure 1:
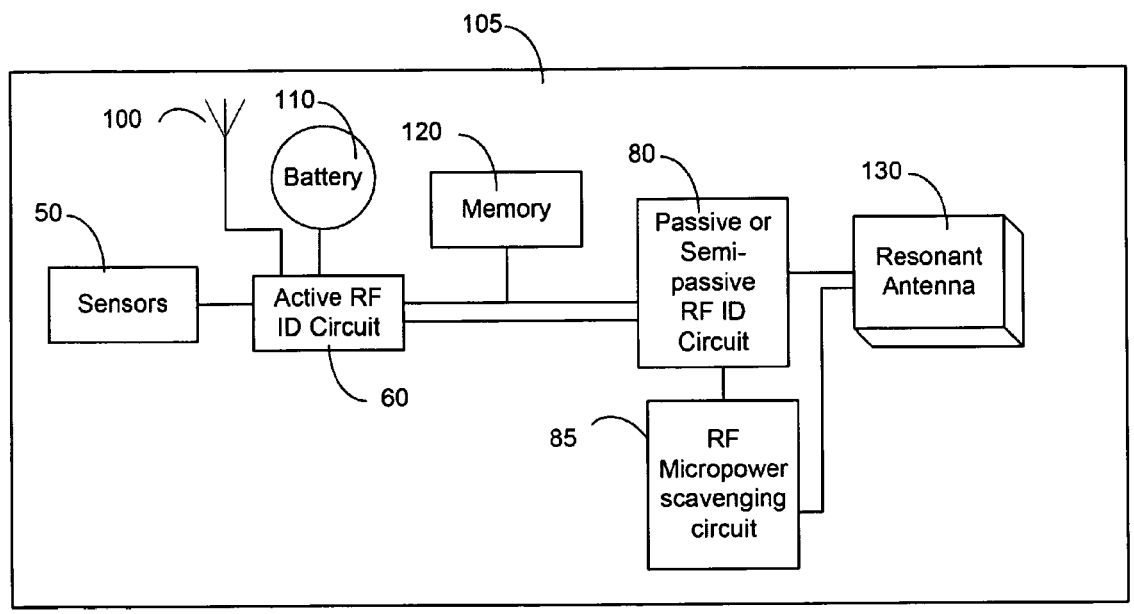
FIG. 1 is a schematic block diagram of an RFID hybrid tag according to an embodiment of the present invention.

FIG. 1 is a schematic block diagram of a hybrid tag 105 according to an embodiment of the present invention. The hybrid tag includes both an active RFID circuit ("active circuit") 60 and either a fully passive or a semi-passive RFID circuit ("passive circuit") 80. In the following description, semi-passive RFID circuits and fully passive RFID circuits are referred to generically as passive circuits.

As illustrated in FIG. 1, the hybrid tag 105 may include separate antennas for the active and passive circuits 60, 80. For example, the active circuit 60 may use a single quarter wavelength whip antenna 100. The passive circuit 80 may use a resonant antenna 130 that contains cavities that are each tuned to a frequency of interest. Alternatively, the active circuit 60 and the passive circuit 80 may share a single antenna.

Sensors 50, which may be connected to components of interest with wired or wireless connections, are also included. For example, a sensor 50 may be connected to a DC solar panel, DC-to-AC solar panel inverter, or an AC power grid. Each sensor 50 may be located in its entirety on the hybrid tag 105. Alternatively, a sensor 50 may be distributed between the tag 105 and the component of interest.

Sensors 50 may be configured to measure voltage, current, power, fluid flow, or any other measureable property associated with the component of interest. If an AC circuit is monitored, separate sensors 50 may be used for each phase of the AC circuit. The neutral wire of the AC circuit may also be monitored. For example, electrical current may be measured with a Hall sensor for AC and DC current flow, a Rogowski coil for sensing AC current levels, or a shunt resistor. Power measurements may be obtained by integrating the current-voltage product over time. Cumulative energy may be determined by integrating the power over a lapsed time period. Specific circuits for sensing current, voltage, power, and temperature are currently included in the function of ICs including the Texas Instruments MSP430FE4232 and the ST Microelectronics STM01FTR.

Sensors 50 may also be configured to monitor environmental parameters. For example, a sensor 50 may monitor parameters such as temperature, pressure, wind speed, and humidity. Sensors may monitor other parameters associated with an object, such as inclination, the status of door openings, or material strain. Sensors 50 may also record audio, still images, and video images. Due to the limited bandwidth generally available to RFID tags, slow scan video may be used instead of full rate video. Slow scan video provides multiple still images at a rate that is generally lower than full rate video, but still effectively represents environmental change over time.

A memory 120 may also be included in the hybrid tag 105. The memory 120 may be a semiconductor integrated circuit (IC) that includes EEPROM and ferroelectric memory. Alternatively, the memory 120 can be a magnetoresistive memory, flash memory, static ram provided with a battery backup, a hard disk drive, or any other type of memory element known in the art. The memory 120 may be connected to the active and passive circuits 60, 80. Both the active circuit 60 and the passive circuit 80 may be able to write to and read from the memory 120. The connection to the memory 120 may be shared between the active circuit 60 and the passive circuit 80. Alternatively, the memory 120 may be a multiport device having separate connections to each of the active circuit 60 and the passive circuit 80.

The active and passive circuits 60, 80 may also include a control component. For example, the control component may be a microprocessor, a microcontroller, or a programmable device, such as a field programmable gate array (FPGA) or a complex programmable logic device (CPLD). In the active circuit 60, the control component is operative to process information retrieved from the sensors 50. In both the active circuit 60 and the passive circuit 80, the control component may implement software that is operative to perform functions such as communicating with the memory 120 and other devices. In accordance with an embodiment of the present invention, it is possible for new software to be downloaded into the active and passive circuits 60, 80 from another device.

The active and passive circuits 60, 80 may also be capable of controlling components of interest. For example, the active and passive circuits 60, 80 may be connected to switches or other control circuitry associated with a component of interest. The component of interest can thereby be controlled or influenced by the active and passive circuits 60, 80.

The active circuit 60 is normally powered externally from the AC power grid or from a source such as a photovoltaic solar panel. A battery 110 or other local source may be included to power the active circuit 60 when external power is not available.

The passive circuit 80 is normally powered by scavenging transmitted RF power from an interrogator 90. The hybrid tag 105 contains an RF micropower scavenging circuit 85 for providing DC power to the passive tag circuit 80. The scavenging circuit 85 may also provide power to the memory 120. This allows for access to the passive circuit 80 and the memory 120 when a separate power source is not available. In the case where a single antenna is shared by the active circuit 60 and the passive circuit 80, the RF micropower scavenging circuit 85 is isolated from the transmit port of the active circuit 60 by a directional coupler to reduce the loss of transmit power from the active circuit 60.

In the case of a hybrid tag that includes a semi-passive circuit, the onboard RF micropower scavenging circuit 85 is supplemented variously by another source of power available to the hybrid tag 105, such as a battery, the power grid, a solar panel, a wind power generator, or a piezoelectric source. The separate source of power permits the semi-passive circuit to operate without requiring scavenged RF power from an interrogator 90. A semi-passive hybrid tag also provides increased range as compared with a hybrid tag 105 that contains only a fully passive circuit.

The active circuit 60, passive circuit 80, sensors 50, and other components of the hybrid tag 105 may all be located on a single printed circuit board (PCB). Alternatively, the components of the hybrid tag 105 may be distributed across multiple PCBs that are connected to each other. The antennas 100, 130 may be separate components or, alternatively, the antennas 100, 130 may be formed using metallic circuit traces on the PCB, as is well known in the art.

Figure 2:
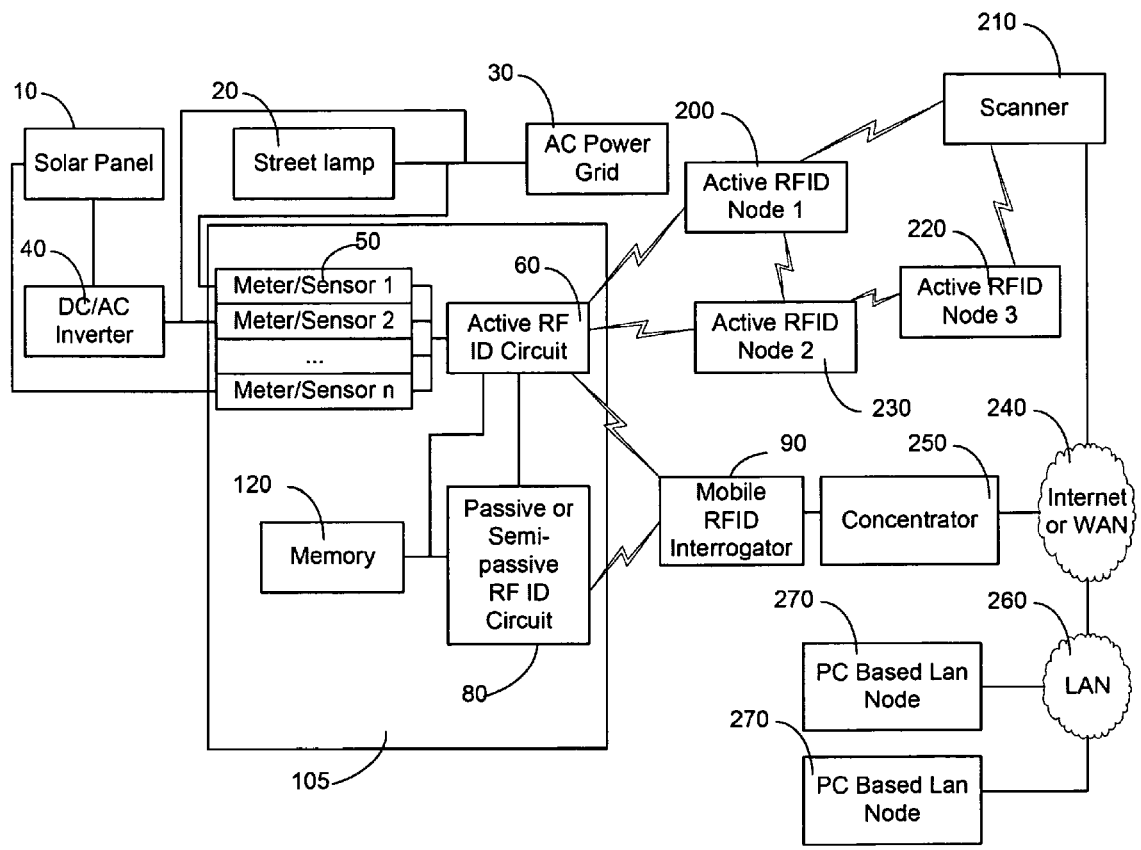
FIG. 2 is a functional diagram of an RFID hybrid system according to an embodiment of the present invention.

FIG. 2 illustrates an exemplary embodiment of an energy metering system according to the present invention. In this embodiment, the metering system includes at least one RFID hybrid tag 105 with an active RFID circuit 60 connected to a passive RFID circuit 80.

Hybrid tags 105 within the system may communicate with other devices and with one another using wireless protocols. The active circuits 60 may communicate with protocols such as the international communications standard 802.15.4, ZigBee, 802.11, and Bluetooth. The passive circuits 80 may communicate via international communications standards such as ISO 18000 and EPC Gen2. The practical frequency range for these wireless operations operating at low and micro power levels is from 300 MHz to 20 GHz with the current state of the art.

A network scanner 210 may be used to monitor the status of the components of interest by accessing the active circuit 60. Typically, the scanner 210 is permanently interfaced via program control into a local area network (LAN) 260, the Internet 240, the telephone network, or some other communications network. In one embodiment, external active RFID nodes 200, 220, 230 communicate with the active circuit 60. The external nodes 200, 220, 230 comprise a star or mesh network with multiple communication paths linking the active circuit 60 to the network scanner 210. The network scanner 210 is programmed to scan the network and retrieve sensor data selectively from the sensors 50.

Similarly, an interrogator 90 may be used to retrieve information from the passive circuit 80. Typically, the interrogator 90 is a mobile device which interfaces to a PC or PDA through a USB port. The interrogator 90 may also access a LAN 260, the Internet 240, or the telephone network. The interrogator 90 may be able to retrieve data from the tag when the power source for the tag is unavailable if the data stored on memory 120 in the tag can be read from and written to by the passive circuit 80 when the source of power for the hybrid tag 105 is not available.

Although typically a handheld device, the interrogator 90 can be located in a fixed location. Alternatively, the interrogator 90 may be mounted in or on a vehicle.

The interrogator 90 contains circuitry that enables it to access the passive circuit 80. The interrogator 90 may also include an active RFID circuit. This feature permits the interrogator 90 to access both the active and passive circuits 60, 80 of the hybrid tag 105.

The active circuit 60 can be controlled from external wired and wireless network nodes, such as a PC based LAN node 270 or for programming in manufacturing through a JTAG bus. The active circuit 60 may have a wireless connection into the mesh or star network of RFID nodes 200, 220, 230 and the network scanner 210 in addition to the wired local connection to the passive circuit 80. Communication including control of the active RFID circuit is obtained variously through the RFID nodes 200, 220, 230; directly through the interrogator 90; or indirectly from the interrogator 90 through the passive circuit 80. Data, including sensor data, may be communicated to and from the hybrid tag 105 through the network scanner 210 and a concentrator 250 to the Internet 240, a telephone network, a local LAN 260, a proprietary network, or any combination thereof by methods well known in the art.

The interrogator 90 can control the active circuit 60 via the passive circuit 80. The interrogator 90 may communicate with the PC Based LAN Node 270 via a wireless network, a LAN 260, a wide area network (WAN) 240, such as the Internet, or some other communications network. The PC based LAN Node 270 can thereby control the interrogator 90. The concentrator 250 may also be used to connect multiple interrogators 90 to a communications network.

Applications for the system of the present invention include monitoring and control of photovoltaic solar panels and windmill power generation in a network that also includes ancillary devices such as light sources, environmental sensors, moisture sensors, water level sensors, and slow scan video imaging equipment. The interface of each of these sensors to the control component in the active circuit 60 is a technology well known to those in the field of sensor systems. Applications are not limited to energy metering systems. For example, hybrid tags 105 could be used for identification of logs in a timber operation, containers in a storage or transportation network, railcars, and vehicles.

The hybrid tag 105 is typically mounted on electrical components or electrical equipment. The active circuit 60 is connected to sensors 50 that the active circuit 60 uses to monitor electrical power and energy. As illustrated in FIG. 2, voltage and current measuring wire leads are connected to components of interest such as a DC solar panel 10, a DC-to-AC solar panel inverter 40, the AC power grid 30, or a street lamp 20. It should be understood that street lamp 20 may represent other loads in place of, or in addition to, a street lamp.

For example, as illustrated in FIG. 2, the sensor 50 connected to the streetlamp may be monitored to determine if the light is on or off. This status information may be accessed from the active circuit 60 through the wireless network by the scanner 210 and also with the interrogator 90.

In addition, the hybrid tag 105, may include control functionality. For example, a solenoid-controlled power switch may be included in the hybrid tag 105. The switch can be enabled or disabled under program control by the active circuit 60. An external device or user can direct the active circuit 60 to change the state of the switch by communicating with the active circuit 60 via a wired or wireless communication network. The state of traffic and street lights can thereby be controlled via the hybrid tag 105 by the user.

The hybrid tag 105 permits connection to more than one electrical source or load. For example, a single hybrid tag 105 can be configured to monitor a single solar panel 10, a group of solar panels, a single DC-to-AC inverter 40, and the external AC power grid 30. Parameters of interest including current, voltage, phase angle, and instantaneous power can be monitored.

Additionally, a history of measurements can be recorded in the memory 120. The hybrid tag 105 can be configured to log sensor data at predetermined time intervals. The hybrid tag 105 may monitor the energy dissipated or delivered to the AC power grid 30 at specific time intervals to thereby determine the cumulative energy dissipated or delivered. For example, current and voltage may be determined for a multi-phase local generation device at 15 minute intervals with power and energy data recorded in memory 120 for readout at a later time.

Both the scanner 210 and the interrogator 90 may interface into a processing device, such as a PC, Personal Digital Assistant (PDA), or a mobile telephone. Users can use such devices to read data stored in the tags, such as data recorded from the sensors 50. Additionally, the tag's 105 operational information, such as the sampling rate for logging operations, the temperature of the tag, and other identification and digital history information located in the tag memory 120 can be retrieved, analyzed, and modified.

The hybrid tag 105, interrogator 90, scanner 210 and the other devices in the system may each include an alarm indicator. The alarm indicator may be used to indicate that a sensor 50 has acquired a measurement that is unexpected or out of specification. A user can thereby be warned of potential problems within the system.

The sensor data obtained from this system can be used by a utility company or an interested business. For instance, a utility company could use the data retrieved from the hybrid tag 105 for billing or crediting purposes relating to power sold or delivered to the utility.

In one exemplary embodiment, the energy metering system may have only minimal passive tag features. In this embodiment, the passive circuit 80 in each hybrid tag 105 is used to wake-up the active circuit 60 under control from the remote interrogator 90. The active circuit 60 is normally powered externally from the AC power grid 30 or from a local source such as a solar panel 10. During brownout or blackout periods, the active circuit 60 automatically enters a sleep mode in order to reduce the energy drain from a small integrally mounted battery 110. The active circuit 60 can be awakened to perform normal sensor operations by the passive circuit 80.

The passive circuit 80 may wake the active circuit 60 from its sleep mode by setting an interrupt that the active circuit 60 monitors. For example, the passive circuit 80 may set the level of a dedicated interrupt input pin on the control component of the active circuit 60 to a level that would cause the active circuit 60 to recognize that an interrupt has been requested. The active circuit 60 then wakes itself up when the available power level is adequate. The data collected from the sensors 50 cannot be readout by the passive circuit 80 in this embodiment. Consequently, sensor data cannot be retrieved when the source of power for the active circuit 60 is not available.

The use of the passive circuit 80 to wake up the active circuit 60 has very general applicability. For instance, the interrogator 90 can be used to direct the passive circuit 80 in a nearby hybrid tag 105 to enable the active circuit 60, to thereby greatly extend the range of the hybrid tag 105. The active circuit 60 may be programmed to enter a sleep mode after a given period of time or when directed to by an external device. When in the sleep mode, the active circuit 60 may not be able to be directly awakened by another active RFID node. However, the passive circuit 80 can be directed by a local interrogator 90 to wake up the active circuit 60.

If the active circuit 60 is powered by the battery 110, the battery may not supply enough energy to maintain the active circuit 60 in a powered-up mode continuously. The active circuit 60 may be programmed to switch between an active mode an a sleep mode with a given duty cycle. Alternatively, the passive circuit 80 may direct the active circuit 60 to switch between an active mode and a sleep mode with a give duty cycle. The active/sleep duty cycle of the active circuit 60 may also be controlled through the passive circuit 60 by the interrogator 90. In some applications, the active circuit 60 may be in a sleep mode more than 99% of the time in order to conserve power.

This simple implementation permits the use of a relatively simple passive circuit 80 to wake up the active circuit 60 at any time. In order to conserve power, the active circuit 60 senses any brownout condition when local tag power is limited, and goes into a sleep mode until acceptable power becomes available. The capability to wake up a sleeping active circuit 60 is especially useful for maintenance and repair situations when the interrogator 90 is available.

The passive circuit 80 may also be operated in a standalone mode without the integral wired connection to the active circuit 60. The passive circuit 80 may be used to directly sense temperature, moisture levels, water levels, light source operation, various identifications, installation dates, repair history, shipment routes, etc. The passive circuit 80 permits reading and writing of this data via a wireless link to the interrogator 90.

In another exemplary embodiment, the energy metering system also includes the ability to log sensor data. In this embodiment, the active and passive circuits 60, 80 in the hybrid tag 105 also share a memory 120 that can be read from and written to through a shared data bus. The passive circuit 80 can take control of the memory bus by enabling an interrupt level to the active circuit 60. Interference between the two circuits addressing the memory 120 can thereby be avoided. Alternatively, the memory 120 may have separate ports respectively for the active and passive circuits 60, 80. This embodiment provides an extra measure of security in the event of a non-recoverable failure of the active circuit 60 because all data stored in the memory 120 can be subsequently read out by the passive circuit 80.

In some embodiments, the system also includes standalone passive RFID nodes. These passive RFID nodes provide identification, installation information, repair history information, origin, part number, and other digital information associated with the devices in the system. The passive nodes are accessed with the interrogator 90.

Figure 3:
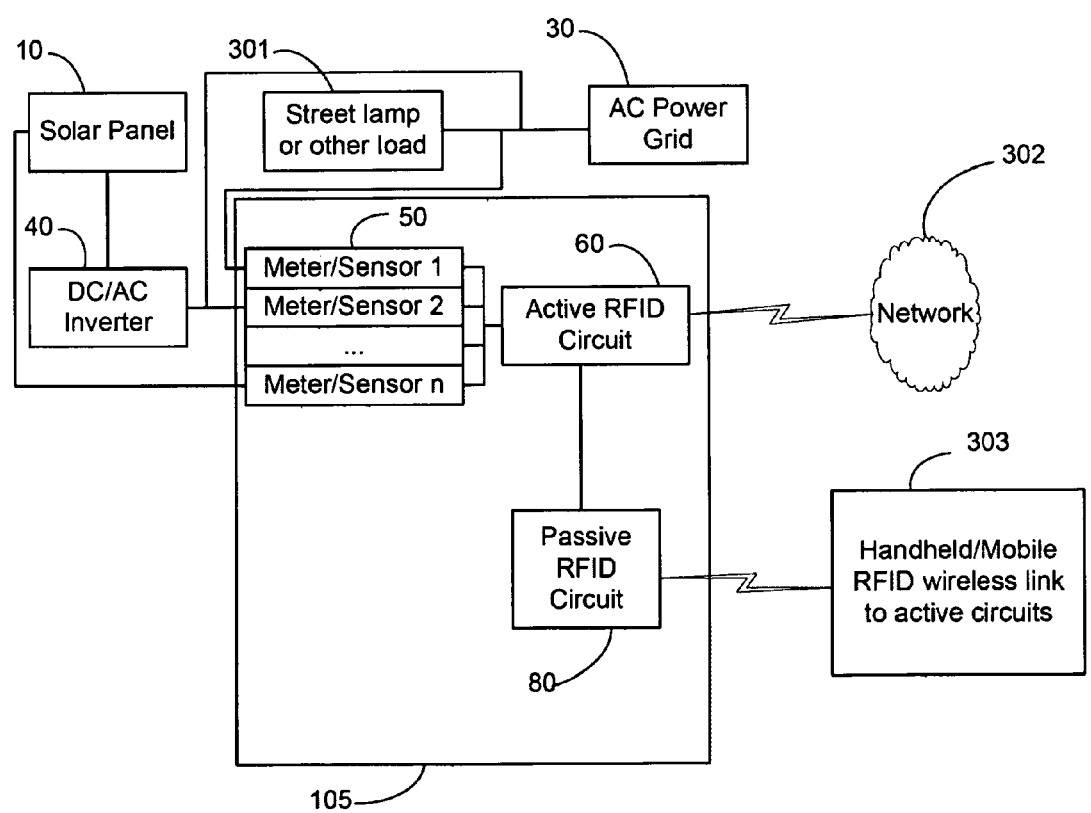
FIG. 3 is a functional diagram of an RFID hybrid system tag and its immediate interfaces according to an embodiment of the present invention.

FIG. 3 illustrates an exemplary embodiment of a hybrid tag 105 and its immediate interfaces according to the present invention. The hybrid tag 105 is usable in the hybrid system illustrated in FIG. 2. Components of FIG. 3 numbered with like numbers in FIG. 2 have been described in the context of FIG. 2 and are not described again with respect to FIG. 3.

FIG. 3 illustrates an application of hybrid tag 105 adapted for interfacing with street lamp or other load 301. A handheld/mobile device 303 is used to retrieve information from the passive RFID circuit 80. The function of handheld/mobile device 303 is substantially the same as the function of interrogator 90 of FIG. 2. Network 302 is substantially the same as Internet (or WAN) 240 of FIG. 2, and network 302 interfaces with hybrid tag 105 by use of system components illustrated in FIG. 2. It should be understood that the links from hybrid tag 105 to network 302 and to handheld/mobile device 303 are bidirectional RF links. In other aspects of operation, the embodiment of FIG. 3 has been described earlier with respect to operation of the embodiment of FIG. 2, and is not described again.

While the invention has been particularly shown and described with reference to exemplary embodiments thereof, it will be understood by those skilled in the art that various changes in form and details may be made therein without departing from the spirit and scope of the invention.

What is claimed is:

1. A radio-frequency identification system comprising:
a hybrid tag, comprising
(i) an active radio-frequency identification circuit,
(ii) a passive radio-frequency identification circuit, and
(iii) a memory;
an interrogator, operative to wirelessly communicate with the passive radio-frequency identification circuit; and
a scanner, operative to wirelessly communicate with the active radio-frequency identification circuit;
wherein the memory can be accessed by both the active radio-frequency identification circuit and the passive radio-frequency identification circuit.

2. The system of claim 1, wherein the active radio-frequency identification circuit and the passive radio-frequency identification circuit are operative to store data into the memory.

3. The system of claim 1, wherein the active radio-frequency identification circuit and the passive radio-frequency identification circuit are operative to retrieve data from the memory.

4. The system of claim 1, wherein the memory is accessed by the active radio-frequency identification circuit and by the passive radio-frequency identification circuit through a shared bus.

5. The system of claim 1, wherein the memory is accessed by the active radio-frequency identification circuit and by the passive radio-frequency identification circuit through separate ports.

6. The system of claim 1, wherein the memory is powerable, individually, by a first power source that powers the active radio-frequency identification circuit and by a second power source that powers the passive radio-frequency identification circuit.

7. The system of claim 6, wherein the second power source is a radio-frequency signal provided by the interrogator.

8. A method for storing and retrieving data, the method comprising:
(i) powering a memory with a first power source that also powers an active radio-frequency identification circuit;
(ii) storing data into the memory, wherein the data is stored into the memory by the active radio-frequency identification circuit;
(iii) powering a passive radio-frequency identification circuit with a second power source;
(iv) retrieving data from the memory, wherein the data is retrieved from the memory by the passive radio-frequency identification circuit.

9. The method of claim 8, wherein the memory retains stored data when neither the first power source nor the second power source provides power.

10. The method of claim 9, wherein the passive radio-frequency identification circuit can retrieve data from the memory when the first power source is not providing power.

11. The system of claim 8, wherein the memory is powerable, individually, by the first power source, and by the second power source.

* * * * *